United States Patent [19]

Chiba et al.

[11] Patent Number: 5,547,749
[45] Date of Patent: Aug. 20, 1996

[54] COLORED CERAMIC COMPOSITION AND METHOD FOR PRODUCING GLASS PLATE USING THE SAME

[75] Inventors: Jiro Chiba, Yokohama; Syuji Taguchi, Koriyama, both of Japan

[73] Assignee: Asahi Glass Company Ltd., Tokyo, Japan

[21] Appl. No.: 394,274

[22] Filed: Feb. 24, 1995

[30] Foreign Application Priority Data

Feb. 24, 1994 [JP] Japan .................... 6-026896

[51] Int. Cl.⁶ .............. B32B 5/02; C03C 4/02; C03C 14/00
[52] U.S. Cl. .......... 428/323; 428/324; 428/325; 428/328; 428/363; 428/428; 501/19; 501/32
[58] Field of Search .................... 428/323, 324, 428/325, 328, 357, 363, 428, 432, 434; 501/17, 19, 22, 23, 26, 32, 73, 74, 75, 79

[56] References Cited

U.S. PATENT DOCUMENTS

| | | | |
|---|---|---|---|
| 2,942,992 | 6/1960 | Dumesnil | 428/432 |
| 3,772,043 | 11/1973 | Michael | 501/19 |
| 4,699,831 | 10/1987 | Hartman | 428/35 |
| 4,777,092 | 10/1988 | Kawakami | 428/428 |
| 4,883,705 | 11/1989 | Kawakami | 428/209 |
| 4,959,090 | 9/1990 | Reinherz | 65/60.4 |
| 5,132,256 | 7/1992 | Beall | 501/95 |
| 5,141,798 | 8/1992 | Chaumonot | 428/195 |
| 5,179,047 | 1/1993 | Chiba | 501/15 |
| 5,244,484 | 9/1993 | Chiba | 65/24 |
| 5,306,674 | 4/1994 | Ruderer | 501/70 |
| 5,332,412 | 7/1994 | Manabe | 65/60.2 |

Primary Examiner—Nasser Ahmad
Assistant Examiner—Leonidas J. Jones, III
Attorney, Agent, or Firm—Oblon, Spivak, McClelland, Maier & Neustadt, P.C.

[57] ABSTRACT

A colored ceramic composition comprising, as inorganic components, from 55 to 75% by weight of a glass powder, from 1 to 17% by weight of a metal powder, from 1 to 25% by weight of a scale-like refractory filler and from 13 to 30% by weight of a heat-resistant coloring pigment.

13 Claims, No Drawings

COLORED CERAMIC COMPOSITION AND METHOD FOR PRODUCING GLASS PLATE USING THE SAME

BACKGROUND OF THE INVENTION

1. Field of the Invention

The present invention relates to a colored ceramic composition which is coated on the surface of a glass plate, particularly on the peripheral part of a window glass for an automobile, together with a silver paste overcoated thereon, and is baked on the glass surface, and also relates to a method for producing a glass plate using the same.

2. Discussion of Background

Heretofore, a black color type ceramic composition was often coated on the peripheral part of a window glass for an automobile to provide a good design. At the same time, a silver paste was overcoated on the ceramic composition paste as a heater for removing a cloud or a blur, thus forming a colored ceramic layer and a silver layer. In the case of the conventional colored ceramic layer thus provided, there was a problem that the silver layer pattern was visible through the colored ceramic layer from the outside of an automobile.

This was because silver of the silver paste layer migrated as a silver ion through the lower-positioned colored ceramic layer and reached the surface of the glass plate, on which the silver ion was reduced to form a silver colloid developing brown color. Thus, the silver colloid was visible as a silver pattern from the outside of an automobile.

SUMMARY OF THE INVENTION

An object of the present invention is to provide a colored ceramic composition which prevents the abovementioned silver ion from migrating through a colored ceramic layer, thereby making a silver pattern invisible from the outside of an automobile, and also to provide a method for producing a glass plate using the same.

Thus, an object of the present invention is to provide a colored ceramic composition which comprises, as inorganic components, from 55 to 75% by weight of a glass powder, from 1 to 17% by weight of a metal powder, from 1 to 25% by weight of a scale-like refractory filler and from 13 to 30% by weight of a heat-resistant coloring pigment, and also to provide a method for producing a glass plate using the same.

DETAILED DESCRIPTION OF THE INVENTION

In the colored ceramic composition of the present invention, sintering becomes unfavorably insufficient if the content of a glass powder is less than 55% by weight. On the other hand, if the content of the glass powder is more than 75% by weight, the object of the present invention can not be achieved since the content of a pigment becomes too small to obtain a desired color tone and the content of a scale-like refractory filler becomes too small to inhibit the migration of silver. The content of the glass powder is preferably in the range of from 62 to 73% by weight.

A metal powder inhibits the migration by diffusion of silver ion. If the content of the metal powder is less than 1% by weight, the effect of inhibiting the migration of silver ion is hardly achieved. On the other hand, if the content of the metal powder is more than 17% by weight, this effect is saturated, and the content of the glass powder becomes so small that sintering tends to become insufficient. The content of the metal powder is preferably in the range of from 3 to 12% by weight. Preferable examples of the metal powder include powders of Fe, Si, Al, Zn, W and Zr which are excellent in this effect. These metals may be used alone or in combination.

A scale-like refractory filler increases the distance between the silver paste layer and the surface of a glass plate where a silver ion migrates, thereby preventing the silver ion from reaching the glass plate surface and consequently achieving an effect of inhibiting the diffusion of silver. If the content of the scale-like refractory filler is less than 1% by weight, its effect is hardly achieved. On the other hand, if the content of the scale-like refractory filler is more than 25% by weight, sintering becomes insufficient. The content of the scale-like refractory filler is preferably in the range of from 3 to 20% by weight, more preferably in the range of from 5 to 15% by weight.

The term "scale-like" means a flat shape, and is concretely defined by "aspect ratio". That is, the aspect ratio A is defined by the formula, $A=b/a$ ("a": diameter of the maximum sphere inscribed to a refractory filler particle, "b": diameter of the minimum sphere circumscribed to a refractory filler particle). The "scale-like" refractory filler used in the present invention is a filler having an average aspect ratio A of about at least 5. This average is a volume-weighed value. A ceramic layer is formed on a glass plate by coating the colored ceramic composition and baking, and, if the aspect ratio of the flake-like refractory filler particle is too large, the adhesive strength of the ceramic layer to the glass plate tends to be lowered. Particularly, the ceramic layer tends to be easily peeled by scratching action. From this viewpoint, the aspect ratio A should be preferably about not more than 15.

In addition to the above-mentioned aspect ratio condition, the scale-like refractory filler should preferably have a size of from 1 to 70 μm and a thickness of not larger than 10 μm. If the scale-like refractory filler has a size of shorter than 1 μm, the filler does not achieve a satisfactory effect of inhibiting diffusion of a silver ion. If the filler has a size of longer than 70 μm, workabilities of preparing a paste of the colored ceramic composition and coating the paste on the surface of a glass plate become unfavorably low. On the other hand, if the filler has a thickness of larger than 10 μm, the surface of the ceramic layer formed becomes unfavorably uneven. Preferable examples of the scale-like refractory filler achieving the aimed effect include mica, alumina, montmorillonite, bentonite and silica. These scale-like refractory fillers may be used alone or in combination.

A heat-resistant coloring pigment used in the present invention is an essential component for providing a desired color tone. If the content of the pigment is lower than 13% by weight, the color tone becomes unpreferably light. On the other hand, the content of the pigment is higher than 30% by weight, sintering becomes insufficient. The content of the pigment is preferably in the range of from 15 to 25% by weight. Examples of the heat-resistant coloring pigment include a Cu-Cr system or F-Co-Cr system black pigment, a $TiO_2$ system white pigment and the like.

At least a part of the above-mentioned glass powder is preferably a crystalline glass, but a non-crystalline glass may be contained in an amount of up to 30% by weight in the glass powder. However, if the content of the non-crystalline glass exceeds 30% by weight, the colored ceramic composition tends to adhere to a mold used for bending, thereby making the operation impossible or making the workability lower when the colored ceramic composition paste and the silver paste are sintered at the same time with bending the glass plate.

The crystalline glass used herein is a glass, at least 30% by weight of which is crystallized when maintained at a temperature of from 600° to 750° C. for 1 hour. This crystalline glass preferably has the following composition.

|  | % by weight |
| --- | --- |
| PbO | 55–70 |
| $B_2O_3$ | 0–8 |
| $SiO_2$ | 18–35 |
| $Al_2O_3$ | 0.5–5 |
| $TiO_2$ | 5–15 |
| $Li_2O + Na_2O + K_2O$ | 0–2 |
| F | 0–2 |
| $SnO_2 + ZrO_2$ | 0–3. |

Among the above components, PbO is a component for precipitating a $PbTiO_3$ crystal and for making a softening point low. If the content of PbO is less than 55%, the softening point of glass becomes unpreferably high. On the other hand, if the content of PbO is more than 70%, the thermal expansion of a glass plate becomes unpreferably large. The content of PbO is preferably in the range of from 56 to 69%.

$B_2O_3$ can be used as a fluxing agent. If the content of $B_2O_3$ is more than 8%, acid-resistance becomes unpreferably low. The content of $B_2O_3$ is preferably not more than 6%.

$SiO_2$ is an agent for forming a glass network. If the content of $SiO_2$ is less than 18%, the softening point becomes too low and the thermal expansion becomes unpreferably large. On the other hand, if the content of $SiO_2$ is more than 35%, the softening point of glass becomes too high. The content of $SiO_2$ is preferably in the range of from 20 to 33%.

$Al_2O_3$ is a component for improving chemical-resistance and for controlling an amount of a crystal precipitated. If the content of $Al_2O_3$ is less than 0.5%, their effects become unpreferably low. On the other hand, if the content of $Al_2O_3$ is more than 5%, the softening point of glass becomes unpreferably too high. The content of $Al_2O_3$ is preferably in the range of from 1 to 3%.

$TiO_2$ is a component for precipitating a $PbTiO_3$ crystal. If the content of $TiO_2$ is less than 5%, an amount of the crystal precipitated becomes unpreferably small. On the other hand, if the content of $TiO_2$ is more than 15%, the glass causes devitrification during melting. The content of $TiO_2$ is preferably in the range of from 7 to 13%.

$Li_2O$, $Na_2O$ and $K_2O$ are used respectively alone or a mixture of two or more for improving chemical-resistance. However, if the content of these components exceed 2% in total, the thermal expansion becomes unfavorable too large.

F is used in the same object as $Li_2O$, $Na_2O$ and $K_2O$. However, its effect is saturated when the content of F reaches 2%. The content of F is preferably not more than 1%.

$SnO_2$ and $ZrO_2$ are used respectively alone or a mixture of two for improving chemical-resistance. However, if the content of these components exceeds 3% in total, the softening point becomes unfavorably too high. The content of these components is preferably not more than 2%.

On the other hand, a non-crystalline glass can be used for densifying a sintered structure and for preventing a change in physical properties including color tone within the scope of the baking operation temperature range. This non-crystalline glass preferably has the following composition.

|  | % by weight |
| --- | --- |
| PbO | 55–70 |
| $B_2O_3$ | 0–8 |
| $SiO_2$ | 20–35 |
| $Al_2O_3$ | 0.5–5 |
| $TiO_2$ | 0–5 |
| $Li_2O + Na_2O + K_2O$ | 0–2 |
| F | 0–2 |
| $SnO_2 + ZrO_2$ | 0–3. |

Among the above components, PbO is a fluxing agent. If the content of PbO is less than 55%, the softening point becomes too high. On the other hand, if the content of PbO is more than 70%, the softening point becomes unfavorably too low. The content of PbO is preferably in the range of from 56 to 69%.

$B_2O_3$ is used as a fluxing agent in the same manner as PbO. If the content of $B_2O_3$ is more than 8%, chemical-resistance becomes unpreferably low. The content of $B_2O_3$ is preferably not more than 6%.

$SiO_2$ is an agent for forming a glass network. If the content of $SiO_2$ is less than 20%, the softening point becomes too low and the thermal expansion becomes unpreferably large. On the other hand, if the content of $SiO_2$ is more than 35%, the softening point becomes too high. The content of $SiO_2$ is preferably in the range of from 23 to 32%.

$Al_2O_3$ is used for improving chemical-resistance. If the content of $Al_2O_3$ is less than 0.5%, its effect is hardly achieved. On the other hand, if the content of $Al_2O_3$ is more than 5%, the softening point becomes unpreferably high. The content of $Al_2O_3$ is preferably in the range of from 1 to 3%.

$TiO_2$ is used for improving chemical-resistance. If the content of $TiO_2$ is more than 5%, the softening point becomes unpreferably too high. The content of $TiO_2$ is preferably not more than 3%.

$Li_2O$, $Na_2O$ and $K_2O$ are used for improving chemical-resistance. However, if the content of these components exceed 2% in total, the thermal expansion becomes unfavorable large. The content of these components is preferably not more than 1.5%.

F is used for improving chemical-resistance. However, its effect is saturated if the content of F reaches 2%. The content of F is preferably not more than 1%.

$SnO_2$ and $ZrO_2$ are used for improving chemical-resistance. However, if the content of these components exceeds 3% in total, the softening point becomes too high. The content of these components is preferably not more than 2%.

The crystalline glass which has the following composition also can be used.

|  | % by weight |
| --- | --- |
| $Bi_2O_3$ | 50–75 |
| $SiO_2$ | 10–35 |
| $B_2O_3$ | 0–15 |
| $TiO_2$ | 0–10 |
| $Li_2O$ | 0–15 |
| $Na_2O$ | 0–15 |
| $K_2O$ | 0–15 |
| BaO | 0–15. |

And the crystalline glass which has the following composition also can be used.

|  | % by weight |
| --- | --- |
| ZnO | 35–45 |
| $SiO_2$ | 27–40 |
| $B_2O_3$ | 10–20 |
| $Li_2O$ | 0–5 |
| $Na_2O$ | 0–10 |
| $K_2O$ | 0–5. |

The colored ceramic composition is usually mixed with an organic vehicle to prepare a paste. An example of the organic vehicle includes a vehicle prepared by dissolving a high molecular resin such as ethyl cellulose in a solvent such as terpineol.

In the production of a glass plate coated with the colored ceramic composition of the present invention, the colored ceramic composition is made into a paste as mentioned above, and the paste is coated on at least a part of the glass plate, usually on the peripheral part of the glass plate, to form a colored ceramic composition layer. The paste is coated usually by screen printing method.

Thereafter, a silver paste is overcoated on at least a part of the colored ceramic composition layer. A well known silver paste can be used in the present invention. The glass plate thus coated with the colored ceramic composition paste and the silver paste is baked to form a colored ceramic layer and a silver layer on the surface of the glass plate. The baking is conducted at a temperature of from 600° to 750° C. for several minutes to several tens minutes.

At the same time with the baking, the glass plate may be processed into a desired shape by press method, self-weight bending method or the like.

An example of a glass plate includes a soda-lime silica glass generally used as a building material, the composition of which comprises from 65 to 75% by weight of $SiO_2$, from 0 to 5% by weight of $Al_2O_3$, from 7 to 12% by weight of CaO, from 0 to 6% by weight of MgO, from 10 to 15% by weight of $Na_2O$ and from 0 to 5% by weight of $K_2O$. The thickness and the size of the glass plate are not specially limited.

In the case of a colored ceramic composition conventionally used, silver is dissolved as a silver ion into the colored ceramic composition, and the silver ion migrates by diffusion through the colored ceramic composition layer to the surface of a glass plate for an automobile and is reduced on the surface of the glass plate to form a silver colloid developing brown color. Thus, such a silver colloid pattern is visible from the outside of the automobile. On the other hand, when the colored ceramic composition of the present invention is used, a silver pattern is concealed and is not visible from the outside of an automobile. The reason why the silver pattern can be concealed is that movable silver ions dissolved in the colored ceramic composition are rapidly converted into an undiffusable form of a silver colloid by the action of a metal powder, and also that the migration of silver ions to the glass plate surface is inhibited by the presence of a scale-like refractory filler.

Now, the present invention will be described in further detail with reference to Examples. However, it should be understood that the present invention is by no means restricted to such specific Examples.

EXAMPLE

Respective starting materials were blended in such a manner as to provide an aimed composition as shown in the following Table 1 and Table 2, and were heated and melted with stirring in a platinum crucible at a temperature of from 1,300° to 1,500° C. for 1 to 2 hours. The melt thus obtained was granulated or reduced to flake-like shapes, and was further pulverized into particles having an average particle size of from 1 to 5 μm by means of a pulverizer such as a ball mill to obtain a glass powder having such a composition (unit: % by weight) as shown in the following Table 1 and Table 2.

The glass powder thus obtained was mixed with metal powders, scale-like refractory fillers and heat-resistant coloring pigments in such a manner as to provide an aimed composition as shown in the following Table 1 and Table 2. The resultant mixture was kneaded with an organic vehicle comprising a high molecular resin (such as ethyl cellulose generally used) and a solvent (such as α-terpineol) to provide a colored ceramic composition paste having a viscosity of from 30,000 to 80,000 cps.

The kinds of metal powders and scale-like refractory fillers used are shown in the following Table 1 and Table 2. With regard to the kinds of the scale-like refractory fillers shown in Table 1 and Table 2, (a) represents mica, (b) represents alumina, (c) represents montmorillonite, (d) represents bentonite and (e) represents silica.

The paste thus obtained was printed on a soda-lime silica glass plate by screen printing method in such a manner as to provide a baked ceramic layer having a thickness of about 15 μm, and was dried at 120° C. for 15 minutes to form a colored ceramic composition layer. A silver paste was then overprinted on the colored ceramic composition layer by screen printing method, and was dried at 120° C. for 15 minutes. The glass plate having layers thus printed was placed in an oven and baked in an atmosphere of 650° to 700° C., and was taken out from the oven after being allowed to stand for 5 minutes in the oven.

After cooling, the colored ceramic composition layer was visually observed from the opposite side of the printed side of the soda-lime silica glass plate, namely through the glass plate, and the visual evaluation was made as to whether the printed pattern of silver was visible or not (that is, as to whether the silver pattern was concealed or not). The results are shown in the following Table 1 and Table 2.

The crystalline glass and the non-crystalline glass thus formed were measured with regard to physical properties such as a transition point (°C.), a softening point (°C.), a crystallization temperature (°C.) and a coefficient of thermal expansion ($10^{-7}$/°C.), and the results are shown in Table 1 and Table 2.

Also, the glass plate coated with the colored ceramic composition paste of the present invention was evaluated with regard to release properties under consideration of practical process ("excellent": the colored ceramic composition did not adhere to a mold during practical process, "bad": the colored ceramic composition adhered to a mold), and the evaluation results are shown in Table 1 and Table 2.

Comparative Examples employed colored ceramic compositions other than those of the present invention. In the same manner as above, comparative ceramic composition pastes and silver pastes were coated on glass plates, baked and evaluated. The results are shown in Table 1. As evident from Table 1 and Table 2, the colored ceramic composition of the present invention is excellent in concealment of silver patterns.

TABLE 1

| | Examples | | | | | | | | Comparative Examples | | |
|---|---|---|---|---|---|---|---|---|---|---|---|
| | 1 | 2 | 3 | 4 | 5 | | 6 | | 1 | 2 | 3 |
| | Crystalline glass | Crystalline glass | Crystalline glass | Crystalline glass | Crystalline glass | Non-crystalline glass | Crystalline glass | Non-crystalline glass | Crystalline glass | Crystalline glass | Non-crystalline glass |
| 1. Glass composition | | | | | | | | | | | |
| $SiO_2$ | 25 | 29 | 19 | 33 | 25 | 30 | 25 | 31.5 | 25 | 25 | 30 |
| PbO | 60 | 56 | 67 | 57 | 60 | 56 | 60 | 60 | 56 | 56 | 61 |
| $B_2O_3$ | 3 | 7 | — | — | 3 | 6 | 3 | — | 6 | 6 | 5 |
| $Al_2O_3$ | 1 | 0.5 | 0.5 | 2 | 1 | 2 | 1 | 0.5 | 2 | 2 | 2 |
| $TiO_2$ | 10 | 6 | 13 | 7 | 10 | 3 | 10 | 5 | 11 | 11 | 2 |
| $Li_2O$ | — | 0.5 | — | — | — | — | — | — | — | — | — |
| $Na_2O$ | 0.5 | — | 0.5 | — | 0.5 | 1 | 0.5 | 1 | — | — | — |
| $K_2O$ | — | — | — | 0.5 | — | — | — | 2 | — | — | — |
| F | 0.5 | — | — | — | 0.5 | — | 0.5 | — | — | — | — |
| $SnO_2$ | — | — | — | 0.5 | — | — | — | — | — | — | — |
| $ZrO_2$ | — | 1 | — | — | — | 2 | — | — | — | — | — |
| 2. Total composition | | | | | | | | | | | |
| Crystalline glass | 70 | 60 | 65 | 62 | 60 | | 50 | | 60 | 50 | — |
| Non-crystalline glass | — | — | — | — | 5 | | 15 | | — | — | 65 |
| Metal powder | Zr 5 | Zn 7.5 Si 7.5 | Si 5 | W 3 | Si 5 | | Fe 5 | | Zn 15 | Fe 30 | Si 5 |
| Scale-like refractory powder | (a) 5 | (b) 5 10 | (c) 15 | (d) 10 | (e) 10 | | (b) | | — | — | — |
| Coloring pigment | 20 | 20 | 20 | 20 | 20 | | 20 | | 25 | 20 | 30 |
| Total | 100 | 100 | 100 | 100 | 100 | | 100 | | 100 | 100 | 100 |
| 3. Physical properties | | | | | | | | | | | |
| Transition point (°C.) | 480 | 490 | 470 | 490 | 500 | | 500 | | 490 | 495 | 480 |
| Softening point (°C.) | 590 | 595 | 590 | 590 | 600 | | 610 | | 580 | 600 | 590 |
| Crystallization temp (°C.) | 650 | 670 | 640 | 660 | 650 | | 660 | | 650 | 650 | — |
| Coefficient of thermal expansion ($10^{-7}$/°C.) | 75 | 73 | 80 | 75 | 77 | | 74 | | 73 | 76 | 79 |
| Concealment of silver | Excellent | Excellent | Excellent | Excellent | Excellent | | Excellent | | Bad | Bad | Bad |
| Release properties | Excellent | Excellent | Excellent | Excellent | Excellent | | Excellent | | Excellent | Excellent | Bad |

TABLE 2

| | Examples | | | | |
|---|---|---|---|---|---|
| | 7 Crystalline glass | 8 Crystalline glass | 9 Crystalline glass | 10 Crystalline glass | 11 Crystalline glass |
| 1. Glass composition | | | | | |
| $SiO_2$ | 18 | 20 | 16 | 35 | 31 |
| PbO | — | — | — | — | — |
| $B_2O_3$ | 6 | 4 | 7 | 14 | 18 |
| $TiO_2$ | — | — | 2 | — | — |
| $Li_2O$ | — | 1 | — | 2 | 2 |
| $Na_2O$ | — | — | 1 | 6 | 6 |
| $K_2O$ | — | — | — | — | 3 |
| $Bi_2O_3$ | 69 | 64 | 70 | — | — |
| BaO | 7 | 11 | 4 | — | — |
| ZnO | — | — | — | 43 | 41 |
| 2. Total composition | | | | | |
| Crystalline glass | 70 | 68 | 64 | 70 | 65 |
| Non-crystalline glass | — | — | — | — | — |
| Metal powder | Fe 3 | W 9 | Si 3 | Si 5 | Zr 10 |
| Scale-like refractory powder | 7 (b) | 5 (b) | 10 (b) | 5 (a) | 10 (b) |
| Coloring pigment | 20 | 18 | 23 | 20 | 15 |
| Total | 100 | 100 | 100 | 100 | 100 |

TABLE 2-continued

| | Examples | | | | |
|---|---|---|---|---|---|
| | 7 Crystalline glass | 8 Crystalline glass | 9 Crystalline glass | 10 Crystalline glass | 11 Crystalline glass |
| 3. Physical properties | | | | | |
| Transition point (°C.) | 470 | 460 | 450 | 460 | 470 |
| Softening point (°C.) | 560 | 560 | 540 | 570 | 580 |
| Crystallization temp (°C.) | 640 | 630 | 610 | 630 | 640 |
| Coefficient of thermal expansion ($10^{-7}$/°C.) | 68 | 82 | 79 | 78 | 69 |
| Concealment of silver | Excellent | Excellent | Excellent | Excellent | Excellent |
| Release properties | Excellent | Excellent | Excellent | Excellent | Excellent |

As mentioned above, the colored ceramic composition of the present invention effectively inhibits the migration by diffusion of silver ions and conceals silver patterns. Also, the composition of the present invention comprises a crystalline glass as a base, and has satisfactory release properties during molding of practical process and is also satisfactory in respect of qualities and production yields.

What is claimed is:

1. A colored ceramic composition, comprising, as inorganic components, from 55 to 75% by weight of a glass powder; from 1 to 17% by weight of a metal powder from 1 to 25% by weight of a scale-shaped refractory filler selected from the group consisting of mica, alumina, montmorillonite, bentonite and silica; and from 13 to 30% by weight of a heat-resistant coloring pigment; and wherein said scale-like refractory filler has an average aspect ratio of at least 5, said aspect ratio being defined by the formula A=b/a, wherein a is a diameter of a maximum sphere inscribed to a particle of said refractory filler and b is a diameter of a minimum sphere circumscribed to a particle of said refractory filler.

2. The colored ceramic composition according to claim 1, wherein the glass powder comprises a crystalline glass and a non-crystalline glass, and the non-crystalline glass has the following composition:

| | % by weight |
|---|---|
| PbO | 55–70 |
| $B_2O_3$ | 0–8 |
| $SiO_2$ | 20–35 |
| $Al_2O_3$ | 0.5–5 |
| $TiO_2$ | 0–5 |
| $Li_2O + Na_2O + K_2O$ | 0–2 |
| F | 0–2 |
| $SnO_2 + ZrO_2$ | 0–3. |

3. The colored ceramic composition according to claim 1, wherein the metal powder is a metal powder of at least one member selected from the group consisting of Fe, Si, Al, Zn, W and Zr.

4. The colored ceramic composition according to claim 1, wherein said glass powder is present in an amount of 62 to 73% by weight.

5. The colored ceramic composition according to claim 1, wherein said metal powder is present in an amount of 3 to 12% by weight.

6. The colored ceramic composition according to claim 1, wherein said scale-shaped refractory filler has a size of from 1 to 70 μm and a thickness of not more than 10 μm.

7. The colored ceramic composition according to claim 1, wherein said heat-resistant coloring pigment is present in an amount of 15 to 25% by weight.

8. The colored ceramic composition according to claim 1, wherein said scale-shaped refractory filler is present in an amount of 3 to 20% by weight.

9. The colored ceramic composition according to claim 8, wherein said scale-shaped refractory filler is present in an amount of 5 to 15% by weight.

10. The colored ceramic composition according to claim 1, wherein at least 30% by weight of said glass powder is crystallized when maintained at a temperature of from 600° C. to 750° C. for one hour.

11. The colored ceramic composition according to claim 10, wherein the crystalline glass has the following composition:

| | % by weight |
|---|---|
| PbO | 55–70 |
| $B_2O_3$ | 0–8 |
| $SiO_2$ | 18–35 |
| $Al_2O_3$ | 0.5–5 |
| $TiO_2$ | 5–15 |
| $Li_2O + Na_2O + K_2O$ | 0–2 |
| F | 0–2 |
| $SnO_2 + ZrO_2$ | 0–3. |

12. The colored ceramic composition according to claim 10, wherein the crystalline glass has the following composition:

| | % by weight |
|---|---|
| $Bi_2O_3$ | 50–75 |
| $SiO_2$ | 10–35 |
| $B_2O_3$ | 0–15 |
| $TiO_2$ | 0–10 |
| $Li_2O$ | 0–15 |
| $Na_2O$ | 0–15 |
| $K_2O$ | 0–15 |
| BaO | 0–15. |

13. The colored ceramic composition according to claim 10, wherein the crystalline glass has the following composition:

| | % by weight |
|---|---|
| ZnO | 35–45 |
| $SiO_2$ | 27–40 |
| $B_2O_3$ | 10–20 |
| $Li_2O$ | 0–5 |
| $Na_2O$ | 0–10 |
| $K_2O$ | 0–5. |

* * * * *